United States Patent [19]

Smith

[11] Patent Number: 4,730,763
[45] Date of Patent: Mar. 15, 1988

[54] MEANS AND METHOD FOR SCORING AND SEVERING AN OPTICAL FIBER

[75] Inventor: Charles T. Smith, Holmes, Pa.

[73] Assignee: TRW Inc., Redondo Beach, Calif.

[21] Appl. No.: 5,384

[22] Filed: Jan. 9, 1987

Related U.S. Application Data

[63] Continuation of Ser. No. 629,940, Jul. 12, 1984, abandoned.

[51] Int. Cl.$^4$ .............................................. B26F 3/00
[52] U.S. Cl. ...................................... 225/96; 225/101
[58] Field of Search ...................... 225/2, 94, 96, 96.5, 225/101, 105

[56] References Cited

U.S. PATENT DOCUMENTS

| | | | |
|---|---|---|---|
| 3,934,773 | 1/1976 | Chinnock et al. | 225/2 |
| 4,118,862 | 10/1978 | Hensel | 225/101 |
| 4,202,475 | 5/1980 | Hirai et al. | 225/2 |
| 4,216,004 | 8/1980 | Brehm et al. | 225/2 |
| 4,229,876 | 10/1980 | Doty | 225/105 |
| 4,413,763 | 11/1983 | Lukas | 225/2 |
| 4,418,855 | 12/1983 | Lamarche et al. | 225/2 |
| 4,621,754 | 11/1986 | Long et al. | 225/2 |

OTHER PUBLICATIONS

"Optical Fiber End Preparation for Low-Loss Splices", D. Gloge, P. W. Smith, D. L. Bisbee, and E. L. Chinnock; The Bell System Technical Journal, vol. 52, No. 9, Nov. 1973.

*Primary Examiner*—E. R. Kazenske
*Assistant Examiner*—Hien H. Phan
*Attorney, Agent, or Firm*—Sol L. Goldstein

[57] ABSTRACT

An optical fiber is scored for severing by placing the fiber on a pad in contact with a surface of the pad and engaging the fiber with a scoring body having a rounded obtuse scoring surface in such manner as to urge said scoring surface into scoring contact with fiber and score the fiber without rotation of the fiber about its longitudinal axis relative to the scoring surface, whereby the scoring contact creates a local flaw in the fiber at which the fiber may be parted by stressing the fiber in tension. The scoring surface of the body is rounded to a curvature such that parting of the fiber at the flaw by stressing of the fiber in tension produces mirror smooth fiber end surfaces at the part. The scoring body may be a blade having a blunt edge providing the obtuse scoring surface or a filament such as an optical fiber positioned across the fiber between the pad and a second pad that are moved together to grip the fiber and simultaneously urge the filament into scoring contact with the fiber.

8 Claims, 8 Drawing Figures

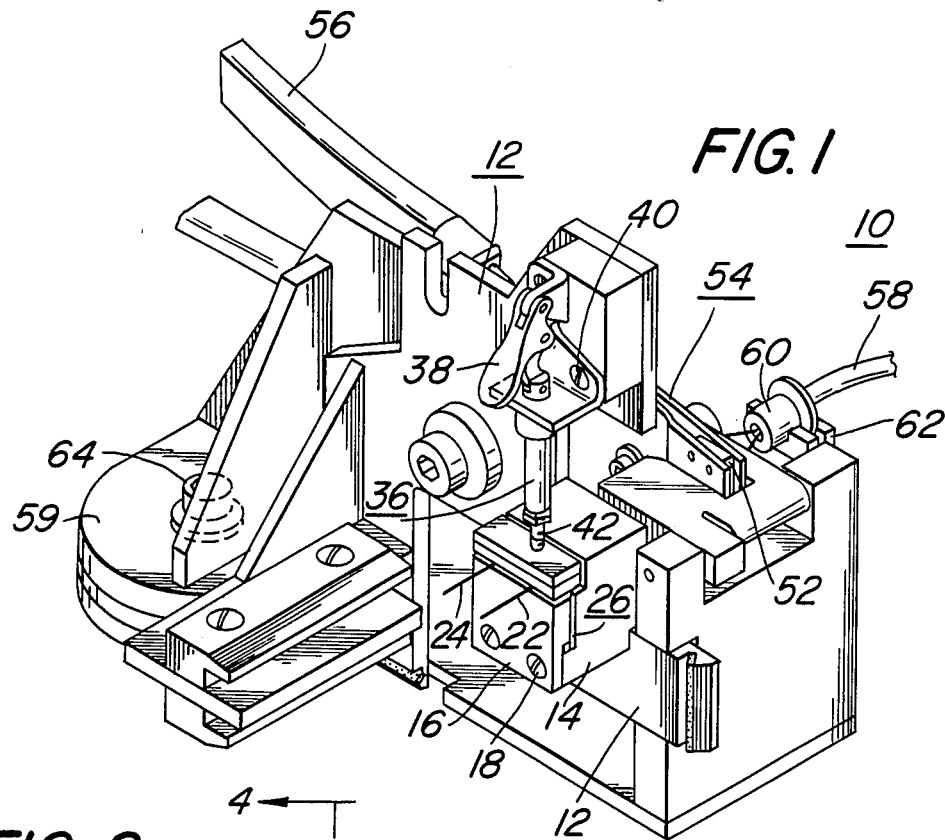
FIG. 1
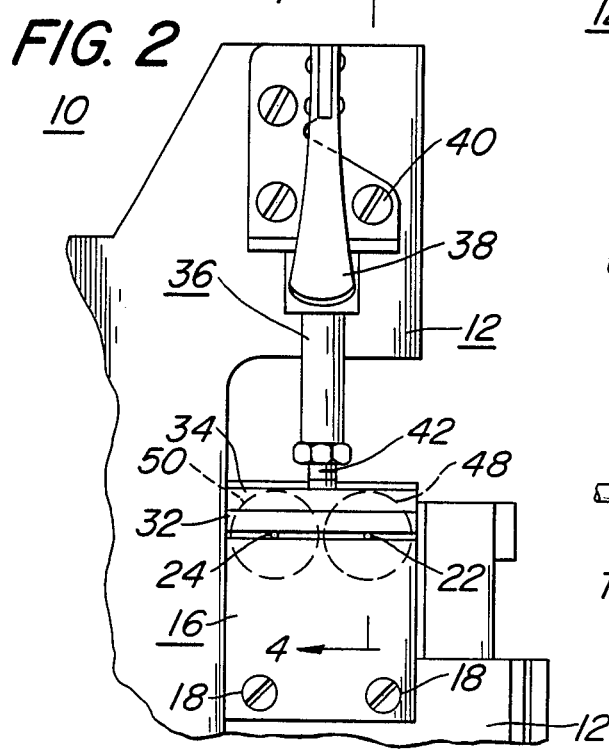
FIG. 2
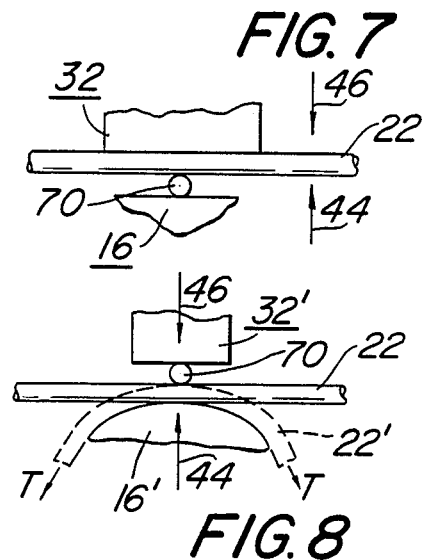
FIG. 7
FIG. 8

MEANS AND METHOD FOR SCORING AND SEVERING AN OPTICAL FIBER

The is a continuation of application Ser. No. 629,940, filed July 12, 1984, now abandoned.

BACKGROUND OF THE INVENTION

The invention relates to a means and method for scoring and severing an optical fiber, and more particularly to a means and method for accurately and reliably scoring and severing an optical fiber requiring minimum maintenance and adjustment for providing the fiber with mirror-smooth and squared ends.

Fibers which propagate light are used in fiber optic systems. Mirror smooth surfaces and squared ends are critical for coupling such fibers together or interfacing devices with the fibers. Heretofore, methods of scoring or inflicting a flaw in a glass fiber required moving a blade with a keen edge. Commonly used were blades and wheels having edges of diamond, silicon carbide, and sapphire materials which were custom sharpened to provide the mirror-smooth fiber ends desired. Such blades and wheels also required frequent custom resharpening due to wear. The need for sharpening and resharpening such blades and wheels in addition to making such apparatus more costly, also required constant inspection and resulted in undesirable operation and down time when the blades required resharpening.

In addition, methods of scoring or inflicting a flaw in a glass fiber that require moving a blade generally utilize such mechanical means as bearings, slides, arms, pivots, etc. to move the blade. Not only are such means susceptible to dirt which affects the smooth operation required for accurately and reliably scoring and severing an optical fiber, but they are also subject to misalignment due to jarring or similar rough handling which results in undesirable operation.

SUMMARY OF THE INVENTION

Therefore a principal object of the invention is to provide a new and improved method and means for scoring and severing an optical fiber which is simple in operation and consistently provides mirror-smooth squared ends without requiring sharpened blades and wheels for scoring purposes.

Another object of the invention is to provide a new and improved means and method for scoring and severing an optical fiber which provides simple scoring and severing of optical fibers to produce mirror-smooth ends without applying lateral movement for inflicting a flaw on the fiber.

Another object of the invention is to provide a new and improved means and method for scoring and severing an optical fiber which cause no torque to be applied to the fiber during the scoring operation.

Another object of the invention is to provide a new and improved means and method for scoring and severing an optical fiber which does not require time consuming custom sharpening of the scoring blades.

Another object of the invention is to provide a new and improved means and method for scoring and severing an optical fiber which provides for precise and accurate flaws to be repeatedly inflicted on one or more optical fibers to be scored and severed.

Another object of the invention is to provide a new and improved means and method for scoring and severing an optical fiber which allows flaws to be inflicted on a fiber in an exact predetermined location, and in alignment on a plurality of single core or multicore fibers by simultaneous scoring of the optical fibers.

Another object of the invention is to provide a new and improved means and method for scoring and severing an optical fiber which can accommodate fibers of various diameters.

Another object of the invention is to provide a new and improved means and method for scoring and severing an optical fiber which is adaptable for severing the fibers by various different means and methods.

Another object of the invention is to provide a new and improved means and method for scoring and severing an optical fiber which allows the scribing and severing operation to take place at the same time or allows for severing immediately following the scoring operation within the same apparatus.

Another object of the invention is to provide a new and improved means for scoring and severing an optical fiber which is simple in operation, consistently provides mirror-smooth and squared ends and allows for long continuous use without requiring maintenance.

Another object of the invention is to provide a new and improved means for scoring an optical fiber which utilizes a fixed means for ruggedness and its nonsusceptibility to dirt.

Another object of the invention is to provide a new and improved means for scoring an optical fiber which can be made and maintained at low cost and is reliable and inexpensive to operate.

The above objects of the invention as well as many other objects and advantages are achieved by providing an optical fiber scoring and severing means comprising a pair of pad elements having opposing surfaces for receiving therebetween an optical fiber which is to be scored. A scoring body with an obtuse surface is positioned to extend between the pad elements for contacting and applying pressure to the fiber at a location where the fiber is to be scored and severed. The pressure is derived from means providing force which is transmitted by the body to the fiber at the contact location. The scoring body may be a blade means which can be secured with one of the pad elements and provides the obtuse surface for contacting and applying pressure to the fiber in the form of an edge positioned between the pad elements. The edge of the blade means is transverse to the fiber at the location where the fiber is to be scored and the blade means can be adjusted for positioning its edge with respect to the surface of the pad element.

The pad element may both be made of elastomeric material or one or both may be made of a rigid material depending upon design requirements. The pad elements are supported for relative movement towards and away from each other for retaining the optical fibers therebetween and scoring the fiber as pressure is exerted by the surface at the desired location on the fiber. The scoring body may also be in the form of a filament which is positioned for being compressed between the pad elements while contacting and applying pressure to the fiber at the location where the fiber is to be scored. The filament preferably is of equal or greater hardness than the material of the optical fiber being scored and may also be an optical fiber identical to that which is being scored. The filament may also be displaced after each scoring action for presenting a new undeformed surface for the next scoring operation.

In one form, the scoring means has pad elements with flat contact surfaces between which one or more of the optical fibers are positioned for being scored. The obtuse surface of the scoring body which contacts and applies pressure to the fibers may also be provided by a substantial constant radius of curvature. Securing means which engages the fiber at one end for applying tension thereto for severing it upon the scoring of the fiber by the scoring body may also be utilized. In another form, one of the pad elements may have a curved surface for supporting the fiber to be scored while tension is applied during or after the scoring operation for severing the fiber. In still another form, the fiber retaining means includes securing means firmly engaging the extending portions of the fibers received between the opposing surfaces of the pad elements. The retaining means is movable with respect to the pad elements for drawing the fiber between the pad elements concurrently with the application of the pressure to the pad elements which resulted in the scoring of the fiber. The movement of the optical fiber between the pad elements generates frictional force tensioning the fiber and then severing it at the inflicted flaw.

The method of scoring an optical fiber comprises the steps of positioning the optical fiber which is to be scored or scribed between opposing surfaces of a pair of pad elements, placing a scoring body between the opposing surfaces of the pair of pad elements and in contact with the fiber at the location where it is to be scored, and moving the pad elements in a direction towards each other for applying compressive force through the scoring body to the fiber at the location to be scored. The method may be applied to single core or multicore fibers or to a plurality of single or multicore fibers for concurrently scoring and severing such fibers at the scored locations.

The term "flaw" or the terms "scored" or "scribed" fiber designate a condition on the outer glass surface of an optical glass fiber such as a scribe mark, or other defect provided for originating a break in the fiber, and as known in the prior art and referred to in the article entitled "Optical Fiber End Preparation for Low-Loss Splices" by D. Gloge, P. W. Smith, D. L. Bisbee, and E. L. Chinnock, published in The Bell System Technical Journal, Vol. 52, No. 9, November, 1973.

BRIEF DESCRIPTION OF THE DRAWING

The foregoing and other objects of the invention will become more apparent as the following detailed description of the invention is read in conjunction with the drawing, in which:

FIG. 1 is a perspective view of a device embodying the invention for scoring a plurality of optical fibers and severing them at the scored locations, FIG. 2 is an enlarged front elevational view of a portion of the device of FIG. 1, FIG. 7 is a diagrammatic view of another form of an optical fiber scoring means embodying the invention, and FIG. 8 is a diagrammatic view of still another form of a fiber scoring and severing means embodying the invention.

Like reference numerals designate like parts throughout the several views.

DETAILED DESCRIPTION OF THE INVENTION

Figure 3:
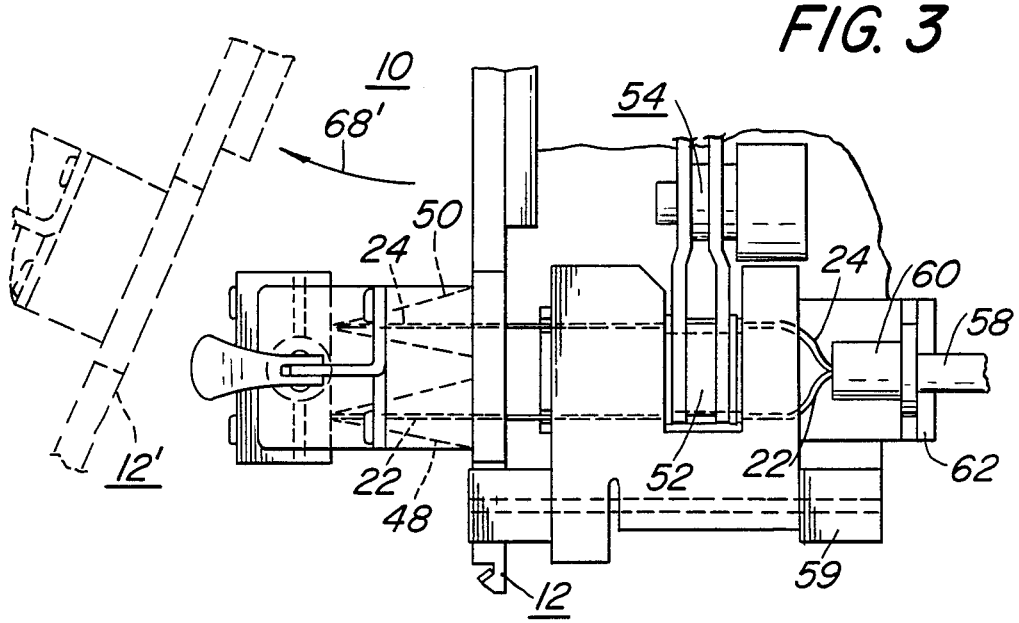
FIG. 3 is a top plan view of a portion of the device shown in FIG. 1.
Figure 4:
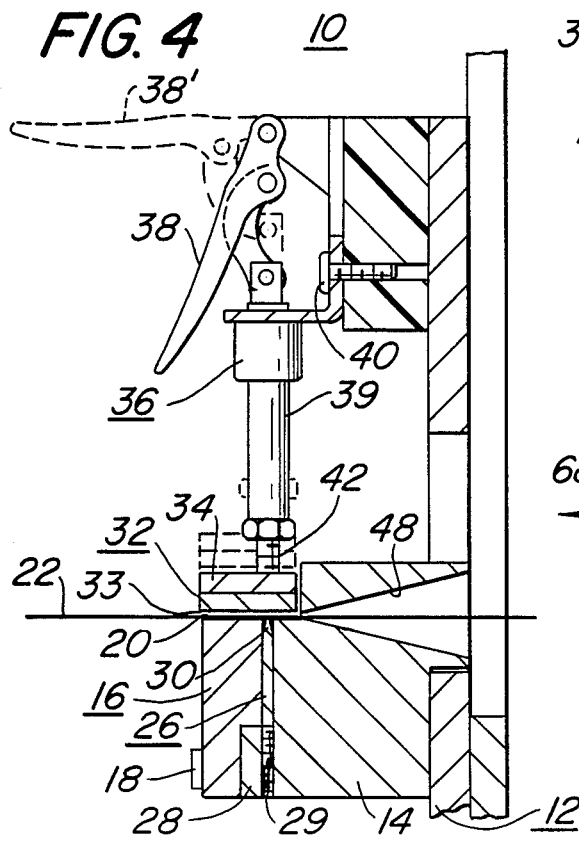
FIG. 4 is an enlarged sectional view taken on the line 4—4 of FIG. 2, FIGS. 5 and 6 are enlarged diagrammatic views of the optical fiber scoring means of the device of FIG. 1 for illustrating its operation.

Refer to FIGS. 1 to 5 inclusive which illustrate an optical fiber scoring and severing means 10, embodying the invention. The means 10 includes a supporting plate 12 which retains a block 14 having a lower pad element 16 secured to one side thereof by bolt means 18. The pad element 16 is made of a rigid metal material although its upper flat surface 20 may be provided by a resilient material depending upon particular design circumstances as will be explained hereafter. The upper flat surface 20 of the pad element 16 receives thereover a pair of parallel aligned optical fibers 22, 24 which are to be scored and severed. A severing body in the form of a blade element 26 is secured with the pad element 16 by being clamped between it and the block 14. The bottom of the blade element 26 is seated on an extending portion 28 of the block 14 through which the bolt means 18 extend. One or more adjusting screws 29 are provided in the block 14 for engaging the bottom of the blade 26 and adjusting the positioning of its upper edge 30 when the bolt means 18 are loosened. Upper edge 30 preferably provides a blunt contact surface 31. If a sharp contact surface is utilized, the edge may require frequent inspection and either resharpening or readjustment for proper operation due to wear.

An upper pad element 32 which may be made of a elastomeric material or of a rigid material, depending upon design requirements, is positioned above the surface 20 of the lower pad element 16 and provides a flat surface 33 for engagement with the surface 20. The upper pad element 32 is movable with respect to the lower pad element 16 by being secured with a retaining member or foot 34 of a clamping means 36. The clamping means 36 is provided with a pivoted handle 38 which is joined to a shaft 39. When the handle 38 is moved to its upward unclamped position shown by dashed lines 38' it raises the shaft 39 and the foot 34 which is connected therewith by the portion 42 for spacing the bottom surface 33 of the pad element 32 from the upper surface 20 of the pad element 16. The clamping means 36 is secured by bracket and bolts 40 with the support plate 12 so that when its handle 38 is moved to its downward position, illustrated in FIG. 4, the shaft 39 and foot 34 are lowered causing the bottom surface 33 of the pad element 32 to contact the upper surface 20 of the pad element 16 and exert a compressive force thereon. By threadedly extending or retracting the portion 42 from the shaft 39, the foot 34 can be lowered or raised for adjusting the compressive force exerted between the pad elements.

Figure 5:
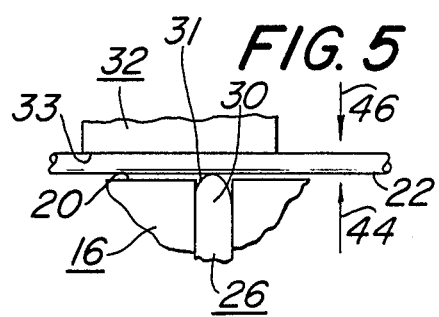
Figure 6:
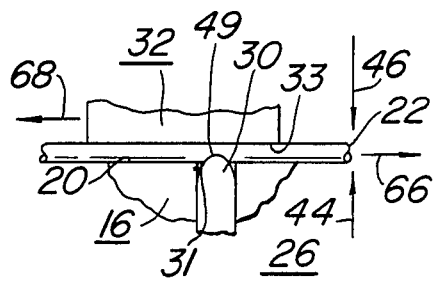

For a consideration of the scoring action in greater detail, refer to the FIGS. 5 and 6. The upper edge 30 of the blade 26 provides a blunt contact surface 31 for engaging and exerting pressure on the optical fibers 22, 24 positioned between the surfaces 20 and 33 of the pad elements 16 and 32. The blunt surface 31 at the edge 30 of the blade 26 is curved so that it does not provide a sharp cutting edge. Preferably, the curvature of the surface 31 is equal to or greater than the curvature of the cross section of the optical fiber 22 being severed. A blunt surface having a curvature such as provided by a constant radius, upon applying pressure to the contacted areas of the fibers 22 and 24, deforms the optical fibers. The deformations or scoring of the fibers results from the flaw of the glassy material of the fibers under the force of the exerted pressure. Thus, with the pads 16 and 32 approaching each other (illustrated by the arrows 44, 46) as the handle 38 of the clamping means 36 is moved downwardly, the optical fiber 22 is compressed between the surfaces 20 and 33. FIG. 6 illustrates the pad elements 16 and 32 in their fully compressed condition in which the edge 30 is believed to precipitate microscopic flaws in the form of microcracks in the surface of the cladding of fiber 22 at the location 49 where it is to be severed. The extent of the flaw may be controlled by the adjustment of the position of the edge 30 of the blade 26 above the upper surface 20 of the lower pad element 16. Thus, as the edge 30 is raised, the extent of the flaw inflicted upon the optical fiber 22 will be increased. Of course, FIGS. 5 and 6 are diagrammatic illustrations which exaggerate the size of the inflicted flaw for purposes of illustration. The use of a resilient elastomeric material for the upper pad element 32 acts to limit and stabilize the coapressive force exerted upon the fiber 22. This can take into account variations in the uniformity of the fiber and allow effective scoring of fibers of different cross sections and for providing the desired severing action. In this regard, it is noted that both the lower and upper pad elements may be made of elastomeric material for achieving such results. Where desired, the upper and lower pad elements may provide rigid surfaces for precisely controlling the force exerted and the extent of the flaws inflicted on the fiber.

For receiving and aligning the optical fibers between the surfaces 20 and 33 of the pad elements 16 and 32, the block 14 may be provided with a respective conically shaped opening 48, 50 (see FIGS. 3 and 4) for each of the fibers 22, 24. The openings are of reduced size in the direction toward the pad elements 16, 32 being enlarged toward the right where the fibers extend between the jaws 52 of a securing means 54 controlled by a manually operated handle means 56. By such means, a cable 58 containing a plurality of optical fibers and having a ferrule 60 can be positioned within the retaining grooves of a holding means 62 while having one or more of its fibers secured between the jaws 52 of the securing means 54 and passing through respective openings 48, 50. The fibers are then received in parallel alignment between the surfaces of the pad elements 16 and 32. With the cable thus positioned and the optical fibers secured and extending between the pad elements 16, 32, the blade element 26 which has its edge 30 extending transversely and perpendicular to the optical fibers inflicts respective flaws at predetermined precise locations at which the desired mirror-smooth squared ends are to be provided.

The mounting plate 12 of the device 10 is pivotally secured by bolt means 64 with the supporting body 59 for movement thereabout. Thus, after the optical fiber 22, 24 are scored, the mounting plate 12 may be pivoted about the bolt 64 in a clockwise direction as indicated by the arrow 68'. The frictional force produced at the surface of the fibers 22, 24 as they are drawn between the pad elements 16, 32 results in the severing of the fibers at the scored locations producing fibers with squared ends having mirror-smooth surfaces. Use of elastomeric material for one or both of the pad elements provides the desired frictional forces for the severing action while minimizing damage to the surfaces of the optical fibers as the fibers are drawn between the pad elements. In this operation, compressive force exerted by the pad elements for inflicting the flaws on the fibers may be retained while the fibers are drawn between the pad elements, or the compressive force may be reduced to a lower level as may be desirable, provided that sufficient frictional force is produced for causing the severing action.

Alternatively, after flaws are inflicted on the fibers, the handle 38 may be raised for removing the compressive force from the fibers and allowing withdrawal of the fibers at the location where the flaws are inflicted, after which the pad elements are displaced to the left of the inflicted flaws by clockwise movement of the supporting bar 12. This displacement to the position shown at 12' in FIG. 3 is indicated by the arrow 68'. The handle 36 of the clamping means may then be moved to its downward position for engaging and retaining therebetween the fibers 22 and 24. Continued exertion of force in the clockwise direction produces tension on the fibers which are still retained at their other ends by the securing means 54. Such application of tension will also result in the severing of the fibers at the inflicted flaws.

Refer to FIG. 7 which diagrammatically illustrates another means and method for inflicting a flaw on the fiber 22 positioned between the pad elements 16 and 32. In place of the blade 26, a filament 70 may be used which is of a material having equal or greater hardness than that of the optical fiber to be severed, such as carbide or other hard wire, or a filament of glass fiber identical to the optical fibers being scored. Where a filament of an optical fiber is utilized, it is also subject to deformation with the exertion of the compressive force for providing the score mark. Such filament may be replaced or may be provided by a continuous filament which is advanced to provide a new undeformed surface for each scoring operation. As shown in FIGS. 7 and 8, the filament 70 may be placed below or above the optical fiber 22 for providing an obtuse surface exerting force for scoring the fiber at the desired location where the fiber is to be severed. After scoring, the optical fiber 22 may be severed by the application of frictional or tension force as described above in connection with FIGS. 5 and 6, or by other conventional methods.

FIG. 8, which illustrates the use of the filament 70 between the pad elements 16' and 32' and above the optical filament 22 which is to be severed, shows the lower pad elements 16' as being provided with a curved surface. This allows the fiber 22' to be positioned as shown about the curved upper surface of the pad element 16' for exerting tensile force T as the flaw is being inflicted by the movement of the pad elements 16', 32' in the direction towards each other in accordance with the method described in the article entitled "Optical Fiber End Preparation for Low-Loss Splices" by D. Gloge, P. W. Smith, D. L. Bisbee, and E. L. Chinnock, published in The Bell System Technical Journal, Vol. 52, No. 9, November, 1973, or the tensile force T may be applied after the flaw is inflicted for producing the severed fiber ends The optical fiber scoring means 10 embodying the invention and the modifications thereof illustrated by the figures provide for scoring optical fibers in a simple manner for providing square surfaces which are mirror smooth. These devices do not require the use of custom sharpened blades which act by transverse movement or sawing action exerting a torque upon the fiber. Such devices allow the method of the invention to be readily carried out for producing the highly desirable fiber ends. The invention operates by applying pressure at a desired location for inflicting the flaw by precipitating microscopic flaws in the form of microcracks in the surface of the fiber's cladding. The means and method of the invention for inflicting a flaw on an optical fiber, thus, is highly controlled and is most reliable for producing the desired severed ends for the optical fibers. The means and method for inflicting the flaw, by allowing one or more fibers or dual fibers to be scored at the same time provides severed ends which are precisely located with respect to each other and also with respect to the end of the cable from which they emanate. Because the invention utilizes an obtuse body for exerting pressure to deform the optical fibers to produce the flaws, precisely honed and sharpened blade edges are not required, removing the necessity of utilizing precisely sharpened scoring edges and maintaining same for proper operation. Although only several arrangements and configurations have been shown for the pad elements, and for the arrangement of the obtuse surface of the scoring body with respect to the pad elements and the optical fibers, it will be obvious that other equally effective arrangements may also be utilized for achieving the advantages of the invention.

It will thus be seen that the objects set forth above, among those made apparent from the proceeding description, are efficiently attained and, since certain changes may be made in the means and method of the invention without departing from the scope of the invention, it is intended that all matter contained in the above description or shown in the accompanying drawing shall be interpreted as illustrative and not in a limiting sense.

What is claimed is:

1. Apparatus for scoring and parting an optical fiber in such a way as to form mirror smooth parting surfaces on the fiber, comprising:
   a supporting body,
   optical fiber securing means for gripping an optical fiber to be scored and parted with a portion of the fiber extending beyond said securing means;
   a fiber gripping and scoring device for gripping and locally scoring said extending fiber portion;
   said fiber gripping and scoring device comprising a pair of pads having confronting surfaces for receiving said fiber portion between said surfaces, actuating means for effecting relative movement of said pads toward and away from one another to frictionally grip and release said fiber portion, and fiber scoring means for scoring the fiber portion upon relative movement of said pads toward one another, to grip the fiber portion, and
   means mounting said securing means and pivotal mounting means for mounting said scoring and gripping device on said body for rotation toward and away from said securing means and for relative movement between said scoring and gripping device and said securing means generally lengthwise of the fiber portion to a scoring position wherein said device is disposed to grip and score said fiber portion to produce a flaw therein, and to stress the fiber in tension across and part the fiber at said flaw.

2. Optical fiber scoring and parting apparatus according to claim 1 wherein:
   said actuating means comprises a clamp mounting one pad for moving the latter pad toward and away from the other pad, and
   said pivotal mounting menas for said fiber scoring and gripping device comprises a support mounting said clamp and said other pad, and a pivotal connection between said support and said body having a pivot axis about which said support is rotatable to rotate said device toward and away from said fiber securing means.

3. Optical fiber scoring and parting apparatus according to claim 2 wherein
   said fiber scoring means comprises a scoring member supported by said one pad and having a rounded convex scoring surface projecting beyond the surface of said one pad and toward the other pad, and
   said clamp is operable to urge said rounded convex scoring surface against the fiber portion to score said fiber portion without any rotation or twisting of the fiber portion about its longitudinal axis and in a manner to produce a local score in a extending only a small distance about the fiber portion at which the fiber portion is parted with mirror smooth parting surfaces by relative movement of said fiber securing means and said fiber scoring and gripping device away from one another while said pads are disposed in gripping relating to the fiber portion.

4. Optical fiber scoring and parting apparatus according to claim 3 wherein:
   said scoring member comprises a blade having said rounded convex scoring along one edge of the blade.

5. Optical fiber scoring and parting apparatus according to claim 3 wherein
   said scoring member comprises a filament such as an optical fiber.

6. Optical fiber scoring and parting apparatus according to claim 3 wherein
   said apparatus further includes a guide between said fiber securing means and said fiber scoring and gripping device for receiving said fiber portion and locating said fiber portion in a plane normal to the pivot axis of said support, and
   the surface of said other pad is disposed substantially in said plane.

7. Optical fiber scoring and parting apparatus according to claim 2 wherein
   said apparatus further includes a guide between said fiber securing means and said fiber scoring and gripping device for receiving said fiber portion and locating said fiber portion in a plane normal to the pivot axis of said support, and
   the support of said other pad is disposed substantially in said plane.

8. Optical fiber scoring and parting apparatus according to claim 2 wherein
   said securing means is adapted to grip a plurality of fibers with portions of the fibers extending beyond said securing means,
   said apparatus further includes a plurality of guides between said fiber securing means and said fiber scoring and gripping device having substantially parallel axes located in a common plane normal to the pivot axis of said support for receiving said fiber portions, respectively, and locating said fiber portions in generally parallel relation within said common plane, the surface of said other pad is disposed substantially in said plane, said fiber scoring means comprises a scoring member supported on said other pad and having a scoring surface located substantially in said plane and extending transverse to the axes of said guides for simultaneously scoring all of said fiber portions, and wherein after scoring the fibers, said support is rotatable away from said securing means to part the fibers.

* * * * *

UNITED STATES PATENT AND TRADEMARK OFFICE
CERTIFICATE OF CORRECTION

PATENT NO. : 4,730,763
DATED : March 15, 1988
INVENTOR(S) : Charles T. Smith

It is certified that error appears in the above-identified patent and that said Letters Patent is hereby corrected as shown below:

Column 8, Claim 2, line 4, correct the spelling of "means".

Column 8, Claim 3, line 21, "a" (third occurrence) should read -- and --. Column 8, Claim 4, line 32, after "scoring" insert -- surface --.

Signed and Sealed this

Sixth Day of December, 1988

Attest:

DONALD J. QUIGG

*Attesting Officer*  *Commissioner of Patents and Trademarks*